(12) United States Patent
Hopkins et al.

(10) Patent No.: US 6,469,488 B1
(45) Date of Patent: Oct. 22, 2002

(54) METHOD OF PROCESSING A HIGH FREQUENCY SIGNAL CONTAINING MULTIPLE FUNDAMENTAL FREQUENCIES

(75) Inventors: Michael B. Hopkins, Dublin (IE); Jean-Marc Overard, Killiney (IE)

(73) Assignee: Scientific Systems Research Limited, Dublin (IE)

( * ) Notice: Subject to any disclaimer, the term of this patent is extended or adjusted under 35 U.S.C. 154(b) by 30 days.

(21) Appl. No.: 09/650,272

(22) Filed: Aug. 29, 2000

(30) Foreign Application Priority Data

Jun. 20, 2000 (IE) .......................... S2000/0498

(51) Int. Cl.[7] .......................... G01R 23/16; G06F 19/00
(52) U.S. Cl. ...................................... 324/76.21; 702/77
(58) Field of Search .................. 324/76.11, 76.21, 324/76.22, 76.24; 702/77

(56) References Cited

U.S. PATENT DOCUMENTS

| | | |
|---|---|---|
| 5,099,194 A | 3/1992 | Sanderson et al. |
| 5,109,188 A | 4/1992 | Sanderson et al. |
| 5,323,103 A | 6/1994 | Choate et al. |
| 5,600,138 A | 2/1997 | Colson et al. |
| 5,808,415 A * | 9/1998 | Hopkins ........... 324/61 |
| 6,061,006 A * | 5/2000 | Hopkins ........... 341/61 |

* cited by examiner

Primary Examiner—N. Le
Assistant Examiner—J Kerveros
(74) Attorney, Agent, or Firm—Thomas M. Freiburger

(57) ABSTRACT

A method of processing a high frequency signal containing at least two different fundamental frequencies F1 and F2 and their harmonic components in order to extract at least one harmonic component of each of the two fundamental frequencies comprises sampling the signal at two sampling frequencies CK1=F1(M1/N1) and CK2=F2(M2/N2), where M1 and N1 are a first pair of integers having no common factor and M2 and N2 are a second pair of integers having no common factor. The sample values resulting from sampling at CK1 are stored cyclically in a set of M1 memory locations such that the nth sample value is stored cumulatively in the remM1[n]th memory location, and the sampled values resulting from sampling at CK2 are stored cyclically in a set of M2 memory locations such that the nth sample value is stored cumulatively in the remM2[n]th memory location. The sampling is continued at each sampling frequency CK1 and CK2 until sufficient sample values have been stored in each memory location of the corresponding set M1 or M2 to substantially average out the other fundamental frequency(s) and its/their harmonic components. Finally, a Fourier analysis of the sample values in each set M1 and M2 of memory locations is performed to extract the said at least one harmonic component of each fundamental frequency F1 and F2.

5 Claims, 3 Drawing Sheets

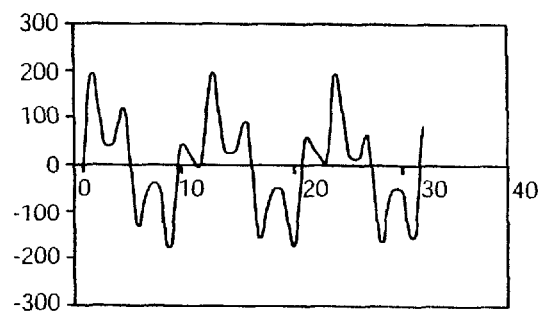
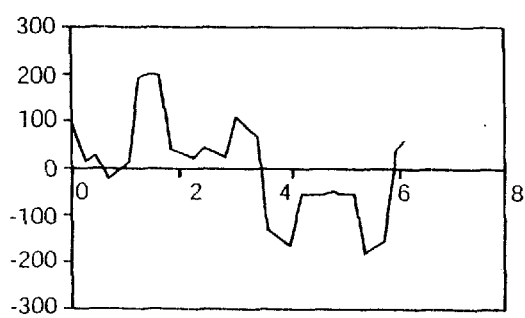
Fig. 1A
Fig. 1B
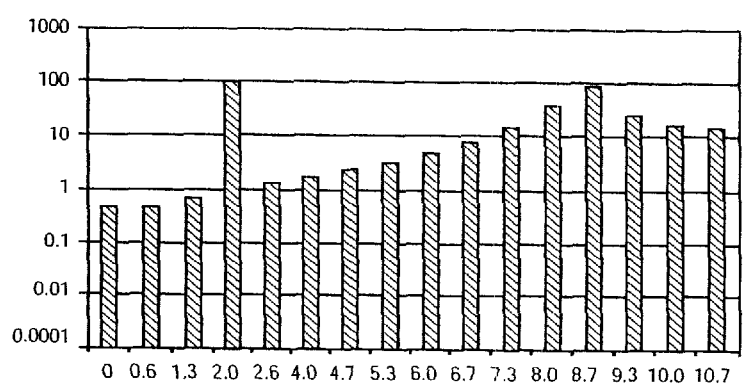
Fig. 2A
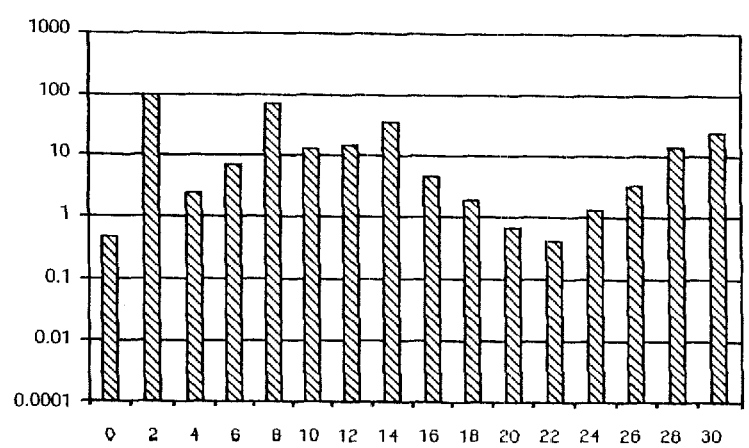
Fig. 2B

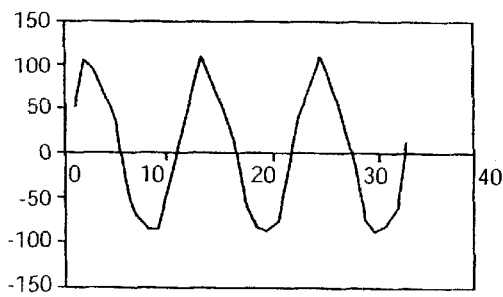 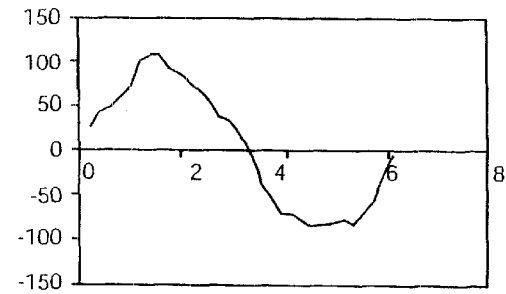
Fig. 3A    Fig. 3B
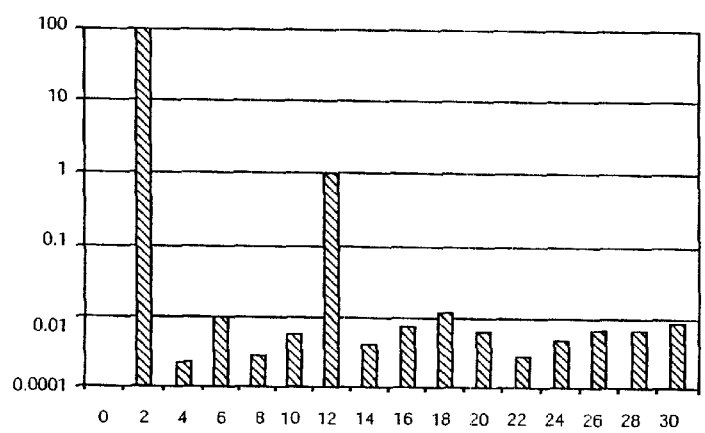
Fig. 4
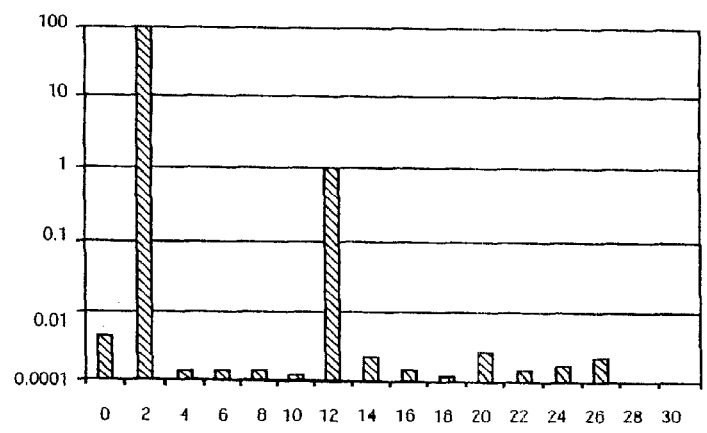
Fig. 5

METHOD OF PROCESSING A HIGH FREQUENCY SIGNAL CONTAINING MULTIPLE FUNDAMENTAL FREQUENCIES

BACKGROUND OF THE INVENTION

The present invention relates to a method of processing a high frequency signal containing at least two different fundamental frequencies and their harmonic components in order to extract at least one harmonic component of each of the two fundamental frequencies. In the present specification "high frequency" means above about 0.1 MHz.

The invention has particular application in the field of plasma processing and, more particularly, to the monitoring and control of plasma processes used in the fabrication of integrated circuits, optical and display devices, magnetic storage media and any other process in which a plasma is used to modify a film substrate.

In a typical plasma process reactor a high power radio frequency (RF) source, typically 0.1 to 100 MHz, is used to break down the gas in the reactor to form a conducting medium containing both electrons and ions. Often a second RF source is used to apply a bias voltage to the substrate being processed to aid, enhance or enable the surface reactions required by the process. In some applications the RF source used to form the plasma has a frequency F1 and the bias RF has a different frequency F2.

There is a significant electrical impedance mismatch between the plasma and the output of the RF generators. A matching unit reduces this mismatch. The matching unit can deal with changes in the plasma density (which alters the plasma impedance) by altering mechanical elements in the match unit. More recently, the matching unit does not have moving components but the match is maintained by altering F1 or F2 to maintain a match.

It has been noted in the prior art that by accurately measuring the RF voltage and current as close to the plasma chamber as possible, the plasma process user can better maintain and control the quality of the plasma process. This has significant financial impact by increasing yield and reducing faults.

Furthermore, the harmonic content of the frequency F1 or F2 can contain useful information on the state of a process, and can be used to detect end of process, or detect faults.

An RF voltage and current sensor, such as that described in U.S. Pat. No. 5,808,415, can be used to measure the RF current and voltage within the plasma chamber and provide corresponding signals Vi and Vv. However, where the plasma process is fed with two different frequencies F1 and F2 the signals Vi and Vv are composite signals containing components of both fundamentals F1 and F2 and their harmonics.

Therefore, there is a need to provide a method of accurately measuring the fundamental and harmonic components of both F1 and F2 in the composite RF signal Vi or Vv, even when F1 and F2 are variable. Current state of the art cannot achieve the rejection ratio and resolution to achieve this type of measurement.

SUMMARY OF THE INVENTION

According to the present invention there is provided a method of processing a high frequency signal containing at least two different fundamental frequencies F1 and F2 and their harmonic components in order to extract at least one harmonic component of each of said two fundamental frequencies, the method comprising sampling the signal at two sampling frequencies $CK1=F1(M1/N1)$ and $CK2=F2(M2/N2)$ where M1 and N1 are a first pair of integers having no common factor and M2 and N2 are a second pair of integers having no common factor, storing the sample values resulting from sampling at CK1 cyclically in a set of M1 memory locations such that the nth sample value is stored cumulatively in the remM1[n]th memory location, storing the sampled values resulting from sampling at CK2 cyclically in a set of M2 memory locations such that the nth sample value is stored cumulatively in the remM2[n]th memory location, continuing said sampling at each sampling frequency CK1 and CK2 until sufficient sample values have been stored in each memory location of the corresponding set M1 or M2 to substantially average out the other fundamental frequency(s) and its/their harmonic components, and performing a Fourier analysis of the said sample values in each set M1 and M2 of memory locations to extract the said at least one harmonic component of each fundamental frequency F1 and F2.

Using the invention, it is possible to sample current and voltage waveforms and measure accurately to very high resolution (>100 dB) the fundamental amplitude of current, voltage and phase of two or more frequencies F1 and F2 in a composite signal. It is also possible to measure accurately the current, voltage and phase of the harmonics of both F1 and F2, typically up to the fifth harmonic, in order to measure important events in the process such as end-point of the process.

DESCRIPTION OF THE DRAWINGS

An embodiment of the invention will now be described, by way of example, with reference to the accompanying drawings, in which:

FIGS. 1 to 5 are various signal plots illustrating the operation of the invention.

DESCRIPTION OF PREFERRED EMBODIMENTS

Figure 6:
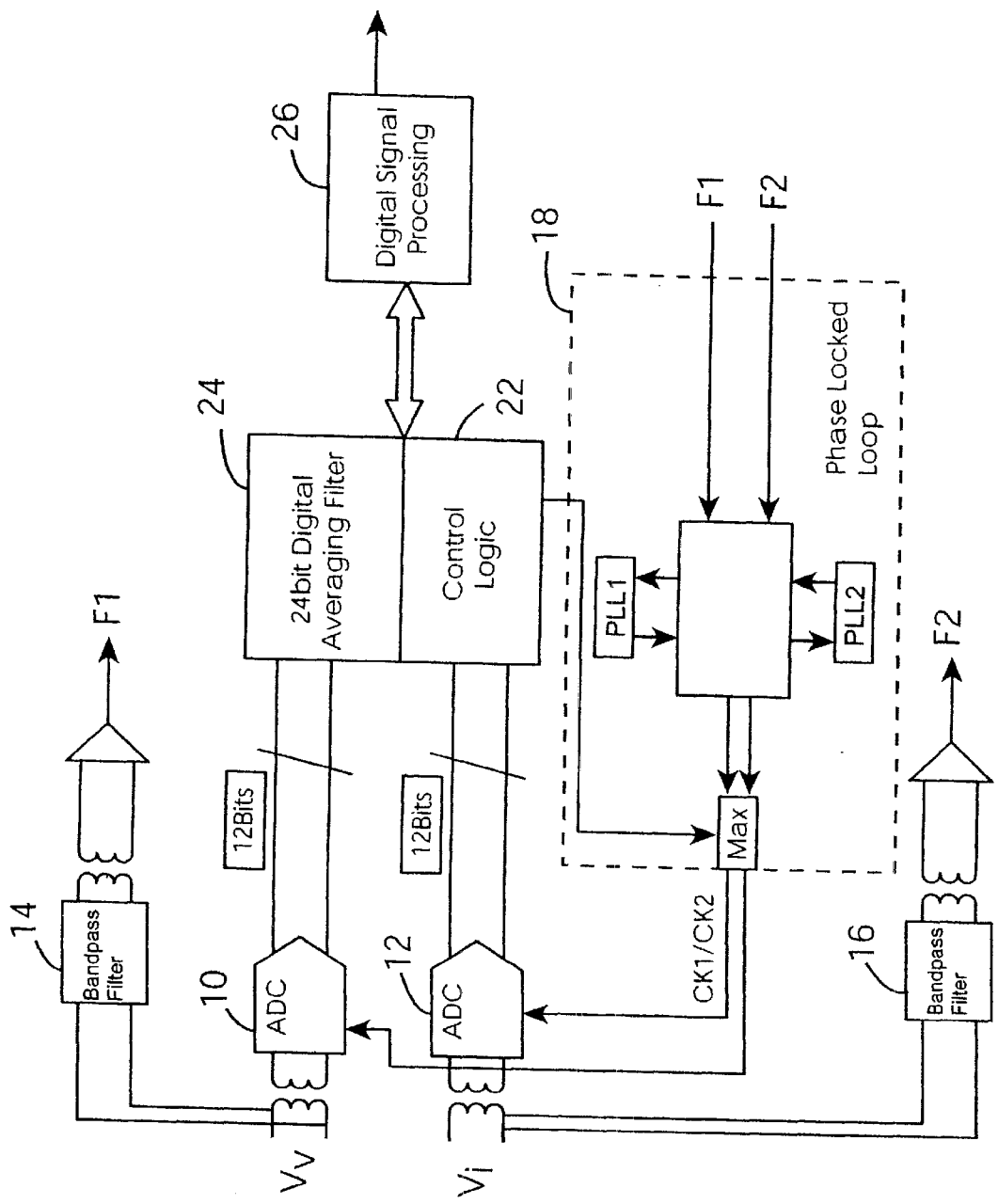
FIG. 6 is a diagram of a circuit for carrying out an embodiment of the invention.

Prior to describing the circuit of FIG. 6, the principles behind the operation of the circuit will first be described.

We assume a composite RF signal, such as the signal Vv or Vi referred to earlier, containing two different fundamental frequencies F1 and F2 and their harmonics.

In order to extract the fundamental and harmonics of F1 and F2, we first sample the composite signal alternately at two sampling frequencies CK1 and CK2 according to the principles disclosed in U.S. Pat. No. 5,808,415. Thus, the composite RF signal is sampled synchronously at a first sampling frequency $CK1=F1(M1/N1)$ and alternately at a second sampling frequency $CK2=F2(M2/N2)$, where M1 and N1 are a first pair of integers having no common factor and M2 and N2 are a second pair of integers having no common factor.

The sample values resulting from sampling at CK1 are stored cyclically in a set of M1 memory locations such that the nth sample value is stored cumulatively in the remM1[n]th memory location. Likewise, the sampled values resulting from sampling at CK2 are stored cyclically in a set of M2 memory locations such that the nth sample value is stored cumulatively in the remM2[n]th memory location.

In the case of the set of memory locations M1 the phase (phi) of the nth sample relative to F1 is given by:

phi($n$)=rem360[($n$−1).360.N1/M1]

Similarly, in the case of the set of memory locations M2 the phase (phi) of the nth sample relative to F2 is given by:

phi($n$)=rem360[($n$−1).360.N2/M2]

In each set M1 and M2 of memory locations the average sample value of the signal at each sampled phase is given by the cumulative sum in the respective memory location divided by the number of samples stored therein.

The sampling continues alternately at each sampling frequency CK1 and CK2 until Na1 samples are stored in each memory location of set M1 and Na2 samples are stored in each memory location of set M2. In practice, to simplify processing, Na1 is made equal to Na2 but this is not essential.

When Na1 samples have been stored cumulatively in each memory location of the set M1, the data stored in this set is transferred to a processor which re-orders the cumulative sample values in phase order and divides them by Na1 to reconstruct the waveform of F1. Similarly, when Na2 samples have been stored cumulatively in each memory location of the set M2, the data stored in this set is transferred to the processor which re-orders the cumulative sample values in phase order and divides them by Na2 to reconstruct the waveform of F2. Alternatively, in each case, instead of re-ordering the sample values, consecutive sample values may be stored in non-consecutive memory locations such that consecutive memory locations contain the sample values in phase order. Thus they can be read out directly by the processor in phase order.

If Na1 is large enough the reconstructed waveform of F1 is substantially free of the fundamental frequency F2 and its harmonics, allowing accurate extraction and measurement of the fundamental and harmonics of F1. Likewise, 1f Na2 is large enough the reconstructed waveform of F2 is substantially free of the fundamental frequency F1 and its harmonics, allowing accurate extraction and measurement of the fundamental and harmonics of F2. Na1 and Na2 are typically greater than 1000.

For example, let us assume:

F1=2 MHz (1% at 6th harmonic) Power=100 w.

F2=13.56 MHz

Power=100 w.

Z=50 ohms resistive.

Noise level=50 dB below the signal level.

Further, let M1=32 and N1=3, so that CK1=21.33 MS/s (MS/s=million samples per second), and let M2=32 and N2=21 to give CK2=13.56 MHz(32/21)=20.66 MHz. It is not necessary for M1 to equal M2, but it does simplify memory organisation in a practical implementation.

To simplify the following discussion we will consider the case of the 2 MHz signal only (F1), and in particular the detection of the 6th harmonic thereof, which for simplicity we will assume to be the only harmonic of F1 present in the composite signal.

FIG. 1A shows the normalised amplitudes of the first 32 sample values stored in the set M1 of memory locations plotted against memory location number, i.e. equivalent to Na1=1. FIG. 1B shows the reconstructed waveform obtained by plotting the same samples as a function of phase, phi.

As the 2 MHz signal is below the sampling frequency of 21.33 MS/s, three waveforms of the 2 MHz signal can be seen in FIG. 1A, but the waveform is highly distorted by the 13.56 MHz signal (F2). However, as the 13.56 MHz signal is above the Nyquist frequency of the 21.33 MS/s clock this signal appears as an aliased component. Also, as the 2 MHz signal is synchronous with the sampling frequency the component in the Fourier Transform (FT) has not the frequency spread normally associated with FT. This is not the case of the aliased 13.56 MHz component which appears as almost a random signal in the 21.33 MS/s case. The Nyquist Theorem limits the frequency range to half the sampling frequency (10.66 MHz). This is illustrated by the FT of FIG. 1A plotted in FIG. 2A, which shows the amplitude of FT components versus frequency.

When the sampled amplitudes are re-ordered as a function of phase, FIG. 1B, the Nyquist limit no longer applies and the limit is set by Fmax=(M1F1)/2, assuming this exceeds the analogue bandwidth of the circuitry before sampling. The re-ordered signal has one waveform only so there is no spread in the frequency at 2 MHz.

FIG. 2B shows the amplitude of FT components versus frequency corresponding to the samples rearranged in increasing order of phase, FIG. 1B. It is clear from FIGS. 2A and 2B that both FTs benefit from synchronous sampling which gives a very good Fourier signal at the fundamental 2 MHz. However in both cases the signal at the 6th Harmonic (1 Volt) of F1 is lost in the spurious signal generated by the 13.56 MHz. It is also noted that while FIG. 2B has a higher frequency range than FIG. 2A, this is only for signals which are synchronous with 2 MHz.

FIGS. 3A and 3B are diagrams equivalent to FIGS. 1A and 1B for the case where ten samples are cumulatively stored in each memory location of set M1, i.e. Na1=10, each data point representing the amplitude of the cumulative sum divided by Na1. It is clear that the spurious signal due to the 13.56 MHz signal is being averaged out and the 2 Mz signal is not. The components of F2 and its harmonics appear more or less randomly located in the memory locations of set M1 since CK1 is non-synchronous with F2.

As Na1 increases the fundamental F2 and its harmonics are averaged out to a greater and greater extent, so that if Na1 is large enough, say greater than 1000, the result is to filter out the F2 components and remove them from the reconstructed waveform of F1. This filter effect also applies to other non-synchronous noise.

To illustrate this FIG. 4 shows the FT of the reconstructed waveform of F1 for Na1=100 samples and FIG. 5 the FT of the reconstructed waveform of F1 for Na1=1000 samples. FIG. 5 shows that after only 1000 samples per memory location, the spurious components due to both the 13.56 MHz signal and background noise have been removed. It is also clear that the 6th harmonic component at 12 MHz is detected to a very high resolution even though this signal is very close to the 13.56 MHz signal. It is also noted that the 6th harmonic signal is above the Nyquist limit of the CK1 sample rate. Other harmonics of F1 will also be detected, although these are not shown in the diagrams referred to.

In a similar manner to the above, after a sufficiently high number Na2 of CK2 samples have been cumulatively stored in each of the memory locations of set M2, the result is to filter out the F1 components and remove them from the reconstructed waveform of F2.

FIG. 6 is a block diagram of a circuit, operating according to the principles described above, for processing two RF signals Vv and Vi supplied by an RF voltage and current sensor such as that described in U.S. Pat. No. 5,808,415. The signals Vv and Vi are derived from a plasma process fed with two different frequencies F1 (=2 MHz) and F2 (=13.56

MHz) so that each signal Vi and Vv is a composite signal containing components of both fundamentals F1 and F2 and their harmonics. The object of the circuit of FIG. 6 is to extract the fundamentals and harmonics of both F1 and F2 from both the signals Vi and Vv.

The signals are fed respectively to two analog to digital converters (ADCs) 10 and 12 each having a 12 bit resolution and 53 MHz sampling rate, with an integral high speed sample and hold circuit operating at 100 MHz. Each ADC may be of type ADS807.

Band pass filters 14 and 16 are used to extract the fundamental frequencies F1 and F2 and these are supplied to a phase locked loop circuit 18, for example of type EP7032, to generate the respective clock signals CK1 and CK2. These clock signals are used to synchronously sample the signals Vv and Vi in the manner described above. CK1 and CK2 are derived as described above, so that CK1=21.33 MHz and CK2=20.66 MHz. These sampling rates are below the sampling limit of the ADCs.

A multiplexer 20, controlled by control logic 22 in a programmable logic array (PLA) 24, alternates sampling of the signals Vv and Vi between CK1 at 21.33 million samples per second and CK2 at 20.66 million samples per second.

The values of Vv sampled with CK1 are stored cyclically and cumulatively in one of a first set of M1 (32 in this example) memory locations in PLA 24 in the manner discused above, and the values of Vi sampled with CK1 are similarly stored cycically and cumulatively in a second set of M1 memory locations in PLA 24. Likewise, the values of Vv sampled with CK2 are stored cyclically and cumulatively in one of a first set of M2 (again 32 in this example) memory locations in PLA 24, and the values of Vi sampled with CK2 are similarly stored cycically and cumulatively in a second set of M2 memory locations in PLA 24. In other words, there are four sets of memory locations, two containing M1 locations each for storing the values of Vv and Vi sampled by CK1 and two containing M2 locations each for storing the values of Vv and Vi sampled by CK2.

When Na1 (=Na2 in this embodiment) samples are stored in each of the memory locations of the four sets of memory locations, the sample data is transferred into a digital signal processor (DSP) 26, for example of type TMS320VC549. This clears the memory locations to enable fresh data to accumulate.

If Na1 and Na2 are set at 1000, then the four sets of memory locations will be filled in less than 2 mS. By buffering the memory no interruption in sample collection is achieved in the present embodiment. In this way up to 500 complete data sets of both the signals Vv and Vi at both clock frequencies can be collected by the DSP 26 per second.

The DSP 26 re-orders each set of M1 or M2 cumulative samples into order of increasing phase, divides each sample by Na1 (=Na2), and stores the resulting waveforms W1$v$ (derived from Vv sampled by CK1), W1$i$ (derived from Vi sampled by CK1), W2$v$ (derived from Vv sampled by CK2) and W2$i$ (derived from Vi sampled by CK2).

In respect of each waveform the DSP 26 calculates a Fourier Transform to extract the fundamental component and its harmonics. Thus in respect of W1$v$ and W1$i$ the DSP 26 would extract the fundamental F1 and its harmonics since F2 will have been filtered out, and in respect of W2$v$ and W2$i$ the DSP 26 would extract the fundamental F2 and its harmonics since F1 will have been filtered out.

As the jitter in the sample and hold between the ADCs 10 and 12 is of the order of +/−100 ps, the phase accuracy of the 13.56 MHz fundamental would be limited to +/−0.50.

However as the reconstructed waveforms have 1,000 points sampled at different times, if we assume the S/H jitter is Gauassian the phase inaccuracy is reduced by almost a factor of a hundred, or +/−0.010 at 13.56 MHz.

The foregoing has described a method using f(m/n) sampling to capture to very high amplitude and phase resolution each harmonic component of a current signal Vi and a voltage signal Vv, even when two frequencies are combined in the signal, using a low cost ADC. The ADC sampling rate can be above or below the Nyquist limit of the signals being measured.

The sampling technique permits accurate determination of voltage amplitude, current amplitude and phase of the fundamental and harmonic components up to the signal bandwidth of the input circuit and S/H. The resolution of the measurement of both amplitude and phase are dramatically improved by averaging many thousands of waveforms of each frequency in a very short period. Storage of waveforms is greatly reduced (only 32 memory locations in the present embodiment). The circuit can track changes in F1 or F2 over a limited bandwidth, where such changes are used to tune a plasma in a fixed match system. The circuit uses relatively inexpensive ADCs with 12 bit resolution and gives high an S/N ratio, greatly enhanced by averaging.

The invention allows accurate determination of impedance, current voltage and phase for plasmas using multiple frequencies and variable frequency matching. This enables accurate process control giving a higher and more consistent process yield in multiple, variable frequency plasma systems. The technique also allows the use of harmonic signals for end point and process control in multiple frequency and variable frequency systems where conventional analogue technique would be unable to separate the various signals.

Although the above has described a circuit in which the Rf signal Vv and Vi are the composite of only two fundamental frequencies F1 and F2 and their harmonics, the technique can be extended to where the signal undergoing processing is a composite of more than two frequencies. If the frequency of interest is F, by sampling at F(m/n) all other frequencies non-synchronous with the sample frequency will be filtered out provided sufficient samples are taken at each phase position.

The invention is not limited to the embodiment described herein which may be modified or varied without departing from the scope of the invention.

What is claimed is:

1. A method of processing a high frequency signal containing at least two different fundamental frequencies F1 and F2 and their harmonic components in order to extract at least one harmonic component of each of said two fundamental frequencies, the method comprising sampling the signal at two different sampling frequencies CK1=F1(M1/N1) and CK2=F2(M2/N2) where M1 and N1 are a first pair of integers having no common factor and M2 and N2 are a second pair of integers having no common factor, storing the sample values resulting from sampling at CK1 cyclically in a set of M1 memory locations such that the nth sample value is stored cumulatively in the remM1[n]th memory location, storing the sampled values resulting from sampling at CK2 cyclically in a set of M2 memory locations such that the nth sample value is stored cumulatively in the remM2[n]th memory location, continuing said sampling at each sampling frequency CK1 and CK2 until sufficient sample values have been stored in each memory location of the corresponding set M1 or M2 to average out the other fundamental frequency(s) and its/their harmonic components, and performing a Fourier analysis of the said sample values in each set M1 and M2 of memory locations to extract the said at least one harmonic component of each fundamental frequency F1 and F2.

2. A method as claimed in claim 1, wherein the number of sample values stored in each memory location of set M1 and M2 is at least one thousand.

3. A method as claimed in claim 1, wherein each sampling frequency CK1 and CK2 is derived from the corresponding fundamental frequency F1 and F2 by frequency multiplication and division.

4. A method as claimed in claim 1, wherein the high frequency signal is an RF signal derived by measuring the voltage or current in a plasma process fed from two RF sources at different fundamental frequencies.

5. A method as claimed in claim 1, wherein a single sampling circuit is used to sample the signal at each of the sampling frequencies CK1 and CK2 by alternately clocking the sampling circuit with clock signals at CK1 and CK2.

* * * * *